US009539731B2

(12) United States Patent
Shafer et al.

(10) Patent No.: US 9,539,731 B2
(45) Date of Patent: Jan. 10, 2017

(54) MAGNETO-RHEOLOGICAL CLUTCH WITH SENSORS MEASURING ELECTROMAGNETIC FIELD STRENGTH

(75) Inventors: Alex Shafer, Thornhill (CA); Mehrdad R. Kermani, London (CA)

(73) Assignee: THE UNIVERSITY OF WESTERN ONTARIO, London, Ontario (CA)

( * ) Notice: Subject to any disclaimer, the term of this patent is extended or adjusted under 35 U.S.C. 154(b) by 1312 days.

(21) Appl. No.: 13/500,316

(22) PCT Filed: Oct. 8, 2010

(86) PCT No.: PCT/CA2010/001577
§ 371 (c)(1),
(2), (4) Date: Jun. 22, 2012

(87) PCT Pub. No.: WO2011/041890
PCT Pub. Date: Apr. 14, 2011

(65) Prior Publication Data
US 2013/0047772 A1 Feb. 28, 2013

Related U.S. Application Data

(60) Provisional application No. 61/272,597, filed on Oct. 9, 2009.

(51) Int. Cl.
*F16D 37/02* (2006.01)
*B25J 19/06* (2006.01)
*F16D 37/00* (2006.01)

(52) U.S. Cl.
CPC .............. *B25J 19/06* (2013.01); *F16D 37/008* (2013.01); *Y10T 74/20305* (2015.01); *Y10T 74/20317* (2015.01); *Y10T 74/20329* (2015.01)

(58) Field of Classification Search
CPC ................................................... F16D 37/008
(Continued)

(56) References Cited

U.S. PATENT DOCUMENTS 5,667,715 A 9/1997 Forster
5,779,013 A * 7/1998 Bansbach ............... F16D 37/02
192/21.5

(Continued)

FOREIGN PATENT DOCUMENTS

WO WO 2012154466 * 11/2012 ................ F16F 9/53

OTHER PUBLICATIONS

Shafer, Alex S. et al., Design and Validation of a Magneto-Rheological Clutch for Practical Control Applications in Human-Friendly Manipulation, 2011 IEEE International Conference on Robotics and Automation, Shanghai International Conference Center, Shanghai, China, May 9-12, 2011.

(Continued)

*Primary Examiner* — William C Joyce
*Assistant Examiner* — Randell J Krug
(74) *Attorney, Agent, or Firm* — Brion Raffoul

(57) ABSTRACT

Systems and methods relating to a clutch system for use in controllably transmitting torque from an input shaft to an output shaft. The clutch system has a torque transmission fluid that has a viscosity that changes based on the strength of an electromagnetic field passing through the fluid. A number of sensors are placed at different radial locations on the torque transmission disks to detect the strength of the electromagnetic field. Based on the strength of the electromagnetic field, the amount of torque being transmitted from the input shaft to the output shaft can be adjusted. Also disclosed is a distributed actuation architecture that uses this clutch system. The distributed actuation architecture allows for the use of a single drive motor in conjunction with multiple instances of the clutch system to actuate a mechanical linkage, such as a robotic arm.

13 Claims, 15 Drawing Sheets

(58) Field of Classification Search
USPC .......................... 192/53.2, 21.5; 74/490.05
See application file for complete search history.

(56) References Cited

U.S. PATENT DOCUMENTS

| | | | |
|---|---|---|---|
| 6,988,602 B2* | 1/2006 | Dolan | B60K 17/35 180/249 |
| 7,070,032 B2* | 7/2006 | Weilant | F16D 33/02 192/21.5 |
| 8,087,476 B2 | 1/2012 | Wassell et al. | |
| 2001/0011851 A1* | 8/2001 | Asao | H02K 3/12 310/179 |
| 2003/0094053 A1 | 5/2003 | Anderson | |
| 2005/0188690 A1* | 9/2005 | Namuduri | B62D 5/0478 60/435 |
| 2006/0042340 A1* | 3/2006 | Wiens | B21D 39/02 72/306 |
| 2009/0292298 A1* | 11/2009 | Lin | B25J 15/0052 606/130 |
| 2010/0295393 A1* | 11/2010 | Dunesme | H02K 3/28 310/71 |
| 2010/0304924 A1* | 12/2010 | Bucknor | B60K 6/36 477/5 |
| 2014/0113828 A1* | 4/2014 | Gilbert | H01L 39/126 505/100 |

OTHER PUBLICATIONS

Shafer, Alexander S., Magneto-Rheological Fluid Based Actuator for Human Friendly Robotic Manipulators, Thesis submitted in partial fulfillment of the requirements for the degree of Master of Engineering Science, Dec. 15, 2009.

Shafer, Alex S. et al., On the Feasibility and Suitability of MR and ER Based Actuators in Human Friendly Manipulators, The 2009 IEEE/RSJ International Conference on Intelligent Robots and Systems, St. Louis, USA, Oct. 11-15, 2009.

Shafer, Alex S. et al., On the Feasibility and Suitability of MR Fluid Clutches in Human-Friendly Manipulators, IEEE/ASME Transactions on Mechatronics, Dec. 2011, vol. 16, No. 6.

Yadmellat, Peyman et al., Adaptive Modeling of a Fully Hysteric Magneto-Rheological Clutch, 2012 IEEE International Conference on Robotics and Automation, RiverCentre, Saint Paul, Minnesota, USA, May 14-18, 2012.

Yadmellat, Peyman et al., Output Torque Modeling of a Magneto-Rheological Based Actuator, IFAC 2011 Conference, Aug. 28, 2011.

Li, Wenjun et al., Linear Torque Actuation using FPGA-Controlled Magneto-Rheological Actuators, ICRA 2014 Conference, May 31, 2004.

Kikuchi, T. et al. Compact MR Fluid Clutch Device for Human-Friendly Actuator, Journal of Physics: Conference Series, 2009, vol. 149, No. 1.

ISR/CA, "International Search Report and Written Opinion" for PCT/CA2010/001577.

* cited by examiner

Fig. 1. Simulated HIC of a single axis manipulator

MAGNETO-RHEOLOGICAL CLUTCH WITH SENSORS MEASURING ELECTROMAGNETIC FIELD STRENGTH

CROSS REFERENCE TO RELATED APPLICATIONS

This application is a National Phase entry of International Patent Application Serial No. PCT/CA2010/001577 filed 8 Oct. 2010, and claims the benefit of priority of U.S. Provisional Patent Application No. 61/272,597 filed 9 Oct. 2009, which are hereby incorporated by reference.

TECHNICAL FIELD

The present invention relates to torque transmission systems and, more particularly, it relates to a torque transmission system using a torque transmission fluid whose viscosity changes based on the intensity or strength of an electromagnetic field passing through the fluid.

BACKGROUND OF THE INVENTION

Increasingly, we are witnessing a growing number of developments in the field of robotics characterized by their intent to integrate man and machine in a safe and functional manner. The suitability of a manipulator to work in close proximity with humans is determined first by the level of safety it can guarantee towards its human counterparts. Guaranteeing safety is a difficult if not impossible exercise as we can rarely guarantee the dependability of the numerous components required to complete a modern manipulator. Add in the human factor, and our task becomes insurmountable.

Thus, much focus has been centered on interactive robots which are expected to perform in a safe and dependable manner in unknown and unpredictable environments. Arguably, the chief safety concern is the manipulator's response to collisions with humans. Such collisions are responsible for numerous injuries each year, despite the existence of barriers, and other fail-safe mechanisms. As we move closer and closer towards a shared environment between robots and humans, new approaches to manipulator design are becoming increasingly important.

Devices utilizing the unique properties of Magneto-Rheological (MR) and Electro-Rheological (ER) fluids have been developed for robotic applications, however almost entirely for use in haptic systems. While it has been suggested in the literature how such devices might be used in a manipulator to improve both safety and performance, there appears to be a general reluctance towards adopting such technology as a viable alternative to the current solutions.

There are several sources of danger when working closely with robotic devices. However, collisions involving robots and humans pose arguably the largest degree of danger. It is expected that collisions will become unavoidable, if not routine as we continue to integrate man and machine into a single working environment.

In the prior art, friction and other nonlinearities present in the transmission of industrial manipulators led to the development of joint torque controlled systems. Characterized by torque sensors located at the joints, such manipulators are capable of achieving precise force control. Moreover, this class of manipulators can be controlled to exhibit very low impedance when operating within the controllable bandwidth. Barring the potential for high velocity collisions, i.e., collisions having their dynamics above the controllable frequency, this implementation can successfully attenuate the impact loads associated with collisions.

However, collisions occurring above the controllable bandwidth are subject to the open loop characteristics of the manipulator. As the demands for performance are increased, such systems require faster and more powerful actuators in order to successfully control and minimize impact forces during a collision. Any degree of safety introduced by a joint torque controlled system relies on the proper operation of system electronics. Thus guaranteeing collision safety becomes difficult as electronic components are susceptible to failure.

In attempts to guarantee the safety of humans within a shared workspace, much research has been focused on the development of manipulators which are intrinsically safe. That is, manipulators which by means of their mechanical properties can guarantee some level of collision safety in the absence of a controller.

To understand the degree of safety one might associate with a manipulator, one can examine the results of an uncontrolled collision through the use of the Head Injury Criterion (HIC). The HIC along with its variations have long been used by the automotive industry to gauge the severity of collisions. In the field of robotics, it can also be used to gain similar insight. The HIC is defined as:

$$HIC = \max_{t_1, t_2} \left\{ (t_2 - t_1) \left[ \frac{1}{t_2 - t_1} \int_{t_1}^{t_2} a(t) dt \right]^{2.5} \right\} \quad (1)$$

where a is the acceleration of the head (in g's), and t1 and t2 are times within the collision selected to maximize the HIC, such that t1<t2.

An HIC of 100 is the maximum value considered to be non-life threatening. To gauge how the effective inertia of a link is related to a manipulator's inherent ability to collide safely, a single axis robot colliding with a human head is simulated. With reference to FIG. 1, the results of the HIC show that a manipulator's safety can be improved by reducing its effective inertia. This find inspired the generation of light weight robots.

One of the first manipulators to be designed under the lightweight paradigm was the Whole Arm Manipulator (WAM). The WAM uses steel cable transmission allowing actuators to be located at the manipulator's base. Removing the actuators from the links reduces the associated link mass, and hence the associated link inertia. This works to improve the inherent safety of the manipulator.

According to the prior art, one manipulator uses light weight carbon composites to form its links. Furthermore, an advanced actuator design integrated with low weight harmonic reduction gears allows this manipulator to attain a fully integrated light weight design.

Locating actuators at the base of the manipulator, or the use of advanced light weight material and actuator design successfully reduce a link's mass, and thus its associated inertia.

However, this approach in the prior art addresses only half of the problem. Robotic manipulators make use of high performance servo motors to drive their links. The output of these servomotors have inverse characteristics to what is desired when actuating the manipulator. More specifically, servo motors produce low output torque, and at high velocity with respect to what is suitable for most robots. To remedy this, gear reduction systems are most commonly employed. The resulting torque at the link is the actuator torque multiplied by the gear ratio $G_r$, while the reflected actuator inertia associated with the rotor of the motor is multiplied by $G_r^2$. Thus, the effective inertia experienced by a robotic link can be expressed as $$J_e = J_l + G_r^2 J_r \quad (2)$$

where $J_l$ is the inertia of the link, and $J_r$ is the rotor inertia of the motor. The reflected actuator inertia of a manipulators can in fact be much larger than that of the link inertia, thereby contributing a larger share of the inertial load during collisions.

In response to this, several prior art actuation systems have been proposed which work to decouple the reflected actuator inertia from the link. However, none of these actuation systems provide enough of a safety margin while providing the desired performance.

Therefore, there is a need for an actuation system which would provide a useful safety margin while providing the required mass and performance.

SUMMARY OF INVENTION

The present invention provides systems and method relating to a clutch system for use in controllably transmitting torque from an input shaft to an output shaft. A clutch system is equipped with input and output torque transmission disks coupled respectively to input and output shafts. The input and output torque transmission disks are interleaved with one another and a torque transmission fluid is placed in between the interleaved transmission disks. The torque transmission fluid has a viscosity that changes based on the strength of an electromagnetic field passing through the fluid. A number of sensors are placed at different radial locations on the torque transmission disks to detect the strength of the electromagnetic field. Based on the strength of the electromagnetic field, the amount of torque being transmitted from the input shaft to the output shaft can be adjusted.

In a first aspect, the present invention provides a clutch system for transmitting torque from an input shaft to an output shaft, the system comprising:
  a plurality of input torque transmission disks coupled to said input shaft;
  a plurality of output torque transmission disks coupled to said output shaft, portions of said input torque transmission disks being interleaved with portions of said output torque transmission disks;
  a torque transmission fluid disposed between said interleaved input torque transmission disks and output torque transmission disks, said torque transmission fluid having a viscosity which changes based on a strength of an electromagnetic field passing through said transmission fluid;
  field means for providing an electromagnetic field which passes through said torque transmission fluid;
  a plurality of sensors for measuring a strength of said electromagnetic field at different radial positions along either of said input torque transmission disks or said output torque transmission disks.

In a second aspect, the present invention provides a method for transmitting torque from an input shaft to an output shaft in a clutch system using a torque transmission fluid which has a viscosity that changes based on an electromagnetic field passing through said fluid, the method comprising:
  a) activating an electromagnetic field to pass through said torque transmission fluid;
  b) applying an input torque to said input shaft;
  c) determining a strength of said electromagnetic field;
  d) estimating an amount of torque being transmitted from said input shaft to said output shaft;
  e) adjusting said electromagnetic field based on said amount of torque estimated in step d)
  f) repeating steps c)-e) until a desired amount of torque is being transmitted from said input shaft to said output shaft.

In a third aspect, the present invention provides a system for bi-directional torque transmission from a single drive motor, the system comprising:
  at least one pair of torque transmission clutches, a first one of said torque transmission clutches being for transmitting torque in a first direction when said first clutch is activated, a second one of said torque transmission clutches being for transmitting torque in a second direction when said second clutch is activated, said second direction being opposite said first direction;
  transmission means for simultaneously transferring torque to each one of said torque transmission clutches from said drive motor;
wherein
  for the or each pair of torque transmission clutches, each clutch comprises a torque transmission fluid with a viscosity which depends on an intensity of an electromagnetic field passing through said fluid.

In a fourth aspect, the present invention provides a system for actuating at least one robotic arm in a robot, the system comprising:
  a single drive motor located at a base of said robot;
  a plurality of clutch sub-systems mechanically coupled to said drive motor and to said at least one robotic arm, said clutch sub-systems operating to transmit torque from said drive motor to said at least one robotic arm
wherein at least one of said plurality of clutch sub-systems transmits torque from an input shaft to an output shaft and comprises:
  said input shaft and said output shaft;
  a plurality of input torque transmission disks coupled to said input shaft;
  a plurality of output torque transmission disks coupled to said output shaft, portions of said input torque transmission disks being interleaved with portions of said output torque transmission disks;
  a torque transmission fluid disposed between said interleaved input torque transmission disks and output torque transmission disks, said torque transmission fluid having a viscosity which changes based on a strength of an electromagnetic field passing through said transmission fluid;
  field means for providing an electromagnetic field which passes through said torque transmission fluid;
  a plurality of sensors for measuring a strength of said electromagnetic field at different radial positions along either of said input torque transmission disks or said output torque transmission disks.

In a fifth aspect the present invention provides a system for actuating at least one robotic arm in a robot, the system comprising:
  a single drive motor located at a base of said robot;
  a plurality of clutch sub-systems mechanically coupled to said drive motor and to said at least one robotic arm, said clutch sub-systems operating to transmit torque from said drive motor to said at least one robotic arm wherein at least one of said plurality of clutch sub-systems bi-directionally transmits torque from said motor and comprises:

at least one pair of torque transmission clutches, a first one of said torque transmission clutches being for transmitting torque in a first direction when said first clutch is activated, a second one of said torque transmission clutches being for transmitting torque in a second direction when said second clutch is activated, said second direction being opposite said first direction;

transmission means for simultaneously transferring torque to each one of said torque transmission clutches from said drive motor;

wherein for the or each pair of torque transmission clutches, each clutch comprises a torque transmission fluid with a viscosity which depends on an intensity of an electromagnetic field passing through said fluid.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Magneto-rheological (MR) and electro-rheological (ER) fluids are a suspension of micrometer-sized particles in a carrier fluid. When subjected to an externally applied field—a magnetic field for MR fluids, and an electric field for ER fluids, the particles aggregate into columns aligning themselves in the direction of the applied field. Subsequently, the columns act to resist shearing of the fluid perpendicular to the field. The apparent yield stress of the fluid is dependent on, and increases with the intensity or strength of the applied field.

Figure 1:
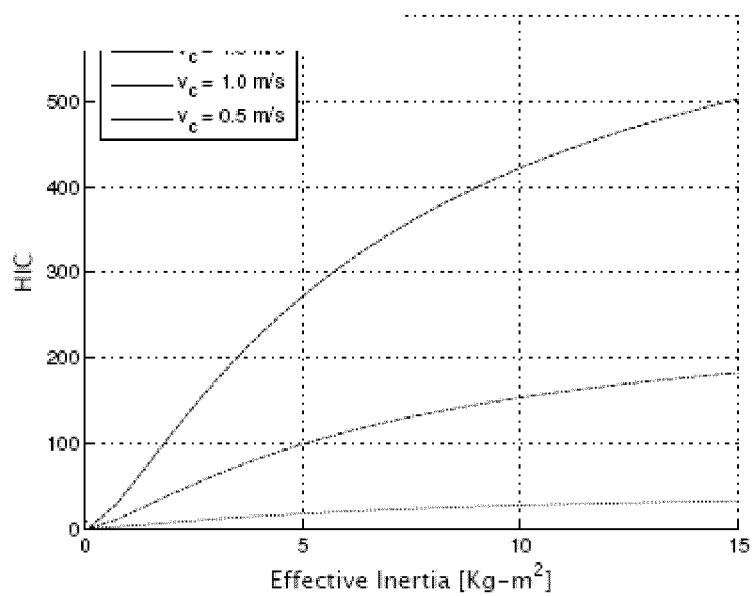
FIG. 1 is a graph showing the HIC for a simulated single axis manipulator.
Figure 2:
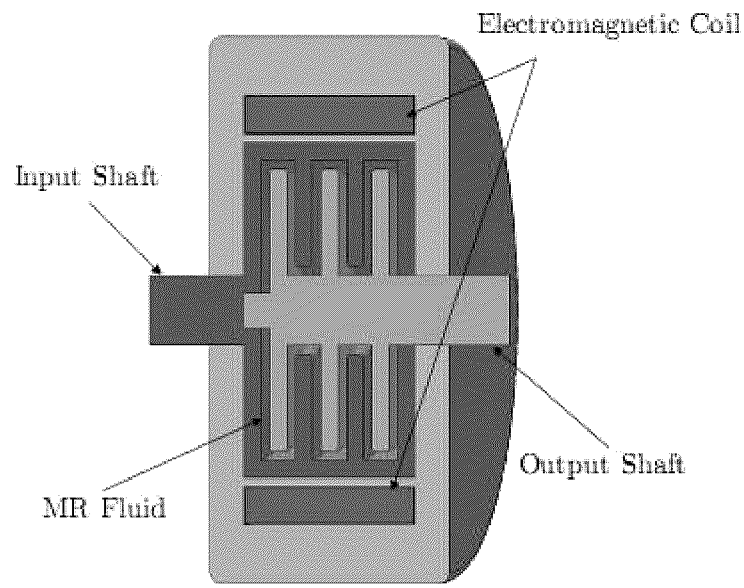
FIG. 2 illustrates a typical MR torque transmission clutch.
Figure 3:
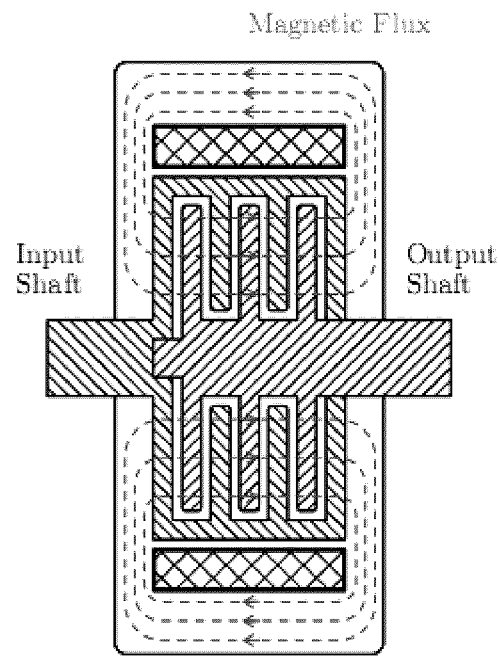
FIG. 3 illustrates the magnetic field lines in the clutch of FIG. 2.

Using either MR or ER fluids, a clutch can be constructed such that the amount of torque it transmits can be controlled by the intensity or strength of an applied field. FIG. 2 is a cross-section of a multi-disk style MR fluid clutch while FIG. 3 illustrates the flux path within the MR fluid clutch. The input shaft breaks out into a set of input disks which are aligned in parallel to a set of output disks attached to the output shaft. MR fluid fills the volume between input and output disks. Rotation of the input shaft causes shearing in the fluid with respect to the output shaft. By energizing the electromagnetic coil, a field is induced in the MR fluid altering its apparent viscosity. The outer casing of the MR clutch acts as the magnetic flux path required to complete the magnetic circuit. An ER clutch is formed much the same way, however does not require a magnetic coil. Applying a high voltage to the input shaft while grounding the output shaft allows an electric field to be induced in the fluid between the input and output disks. Again, this field controls the apparent viscosity in the fluid.

Figure 4:
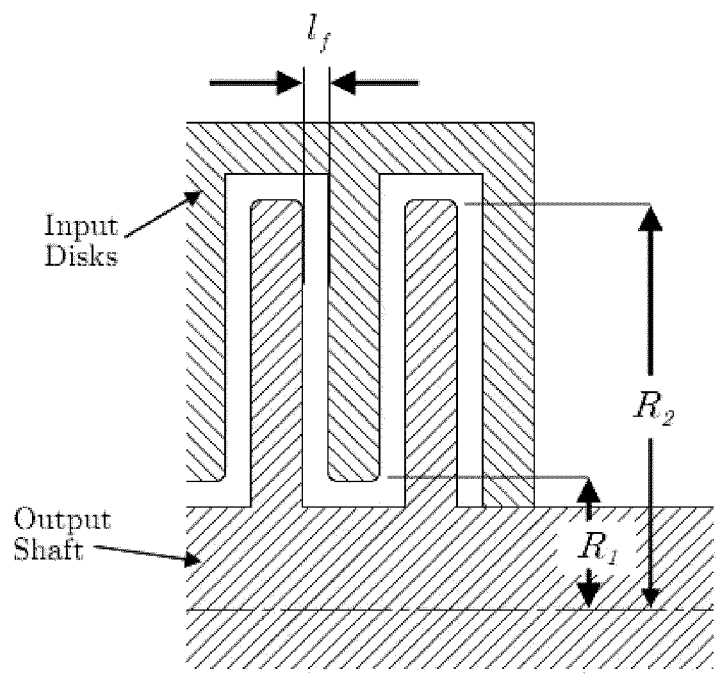
FIG. 4 is a diagram illustrating the various dimensions to be used in the calculations according to one aspect of the invention.

A number of models have been developed to describe the behavior of both MR and ER fluids. The Bingham viscoplastic model is commonly used to represent the sheer stress of the fluid as a function of the applied field, and shear rate. The model is given by $$\tau = \tau_y(\Phi) + \eta \frac{dv}{dz}, \tau > \tau_y \quad (3)$$

where $\tau$ is the shear stress, $\tau_y$ is the field dependent yield stress, $\Phi$ is the applied field (magnetic field intensity H in an MR device or electric field E in an ER device), $\eta$ is the Newtonian viscosity, and dv/dz is the velocity gradient in the direction of the field. Applying the Bingham visco-plastic model to a clutch, we can define r as the radius from the rotational axis, and $l_f$ as the thickness of the fluid filled gap between input and output disks. In situations where $r \gg l_f$ for $r \in [R1, R2]$ (refer to FIG. 4), the velocity gradient becomes constant. We can then rewrite eqn. (3) as $$\tau = \tau_y(\Phi) + \eta \dot{\gamma}(r), \quad \tau > \tau_y \tag{4}$$

where the shear rate $\gamma$ is defined as $$\dot{\gamma} = \frac{\omega r}{l_f} \tag{5}$$

and $\omega$ is the angular velocity between input and output shafts of the clutch. The torque produced by a circumferential element at a radius r is given by.

$$dT = 2\pi r^2 \tau \, dr. \tag{6}$$

Figure 5A:
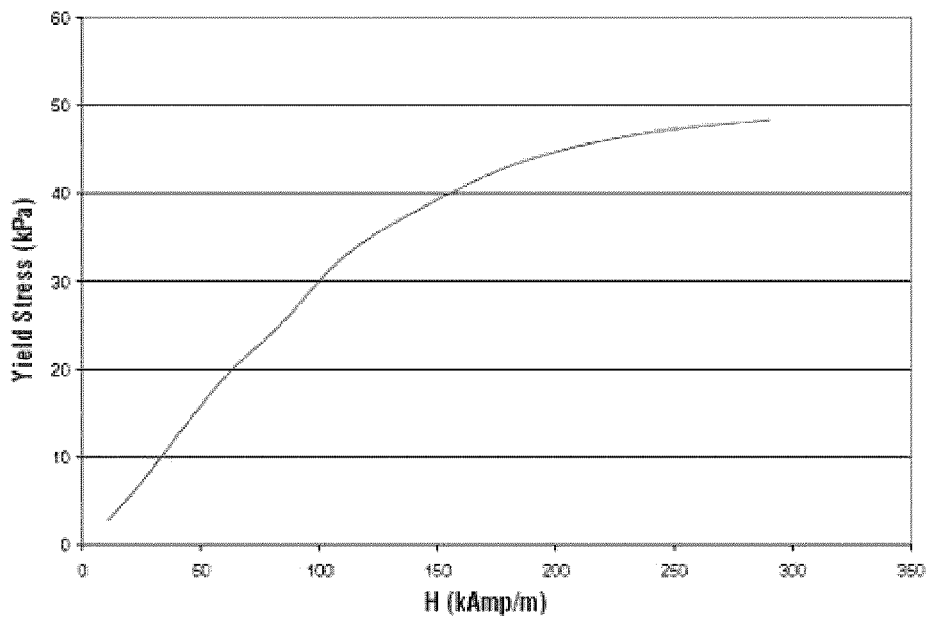
FIGS. 5A and 5B illustrates the field dependence of yield stress for a specific MR fluid (FIG. 5A) and for a specific ER fluid (FIG. 5B)
Figure 5B:
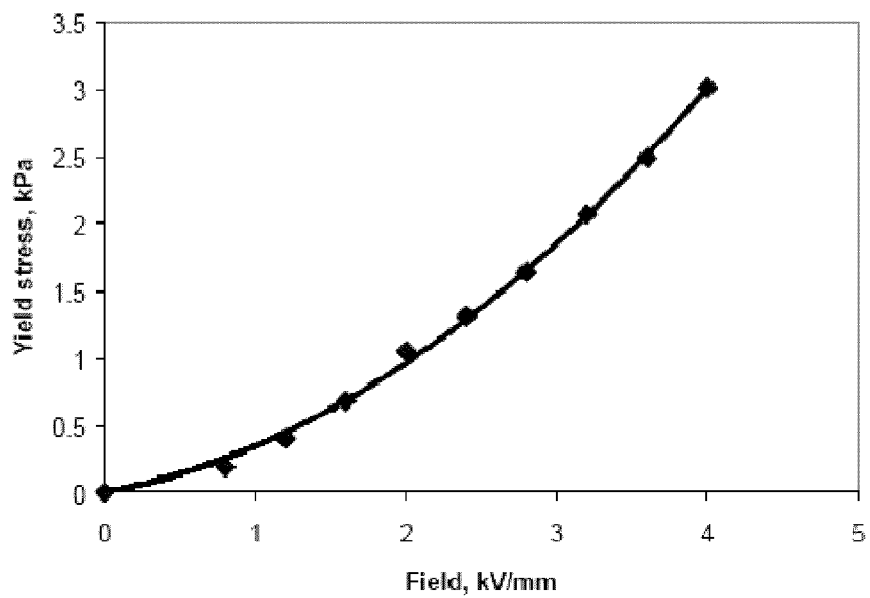

We define a clutch as having N output disks. Substituting (4) into (6) and integrating across both faces of each output disk, we arrive at $$T = 2N \int_{R_1}^{R_2} 2\pi \left[ \tau_y(\Phi) r^2 + \eta \frac{\omega r^3}{l_f} \right] dr \tag{7}$$

$$= 4N\pi \left[ \frac{\tau_y(\Phi)(R_2^3 - R_1^3)}{3} + \frac{\eta \omega (R_2^4 - R_1^4)}{4 l_f} \right]$$

as the torque transmitted by an N-disk clutch. Data relating the yield stress $\tau_y$ of a fluid to an applied field are generally published by the manufacturer. Data for two commercially available fluids are reported in FIGS. 5A and B. FIG. 5A is the field dependence of yield stress for the MR fluid MRF-132DG produced by Lord Corp. while FIG. 5B is the field dependence for yield stress for the ER fluid LID 3354S produced by Smart Technology Ltd. The viscosity $\eta$ of the carrier fluid is typically in the range of 0.1 to 0.3 Pa-s. The maximum torque transmission capability of an MR/ER clutch is dependent on the maximum yield stress the material can produce. MR fluids exhibit saturation in their yield stress at high field strengths. This is a result of the underlying physics, and limits the amount of torque a particular MR fluid can transmit in clutch applications. ER fluids on the other hand, experience electrical breakdown at high field strengths, also limiting their torque transmission capacity. MR fluids can produce maximum yield stresses typically in the range of 50 to 100 kPa depending on their chemistry. Alternatively, this value for ER fluids does not typically exceed 10 kPa. It should be noted that more recent research into the field of ER fluids has produced materials exhibiting a yield stress on par and even exceeding that of MR fluids.

Both MR and ER fluids respond to an applied field on the order of 1 ms. However, in the case of MR clutch, actuation response becomes delayed due to field propagation through the magnetic circuit. As the magnetic field propagates from the coil, it is met by an opposing field produced by induction currents in the magnetic circuit. The response delay produced by this effect is exacerbated by the use of conductive material in the magnetic circuit. Special design techniques not unlike those used to construct large power transformers can be adapted to minimize the magnitude of the induced currents.

MR/ER actuators have the characteristic of replacing the reflected rotor inertia of the motor with the reflected inertia of the clutch output shaft and disks. The benefit of MR/ER actuators is their high torque to output moment of inertia ratio as compared to servo motors. To show this, we approximate the radius of the output shaft to be equivalent to $R_1$. The moment of inertia of a single output disk, $J_d$ is given by $$J_d = \frac{1}{2} \pi \rho_d l_f (R_2^4 - R_1^4) \tag{8}$$

where $\rho_d$ is the mass density of the disk material, $l_f$ is the thickness of the disk (commonly between 0.5 to 1 mm), and $R_1$ and $R_2$ define the minor and major radii respectively, of the output disk. If we consider the torque transmitted solely by the field dependent yield stress of the MR/ER fluid, the torque transmission of a single disk is then given by, $$T_d = \frac{4}{3} \pi \tau_y (R_2^3 - R_1^3) \tag{9}$$

Furthermore, if we consider $R_1$ to be small, that is $R_2 \gg R1$, then the contribution of the shaft region to both (8), and (9) is also small. By allowing R1 to equal zero, we can approximate the torque-inertia ratio of a single disk to be $$\alpha = \frac{T_d}{J_d} = \frac{8}{3} \frac{\tau_y}{\rho_d l_d R_2} \tag{10}$$

As observed the ratio becomes less favorable as $R_2$ increases. This however is not the final measure that dictates the actuator's suitability. To grasp the overall effects of increasing radius, and hence torque capacity, the reflected inertia at the joint should be considered. The reason for this is that as radius increases along with torque capacity, the gear ratio required to amplify the actuator's torque decreases. As the actuator inertia multiplies the square of the gear ratio to arrive at the reflected inertia at the joint, the analysis becomes important. The reflected inertia of the MR/ER clutch at the manipulator joint is given by $$J'_c = \frac{1}{2} \pi \rho_d l_d N [R_2^4 - R_1^4] G_r^2 \tag{11}$$

where we have included N to multiply the inertia by the number of disks in the clutch. The gear ratio $G_r$ is defined as $$G_r = \frac{T'_c}{T_c} \tag{12}$$

where $T'_c$ is the desired torque at the joint, and $T_c$ is the output torque of the clutch. Rearranging (9) to show the outer radius $R_2$ as a function of the clutch output torque yields $$R_2 = \left(\frac{3}{4} \frac{T_c}{\pi \tau_y N} + R_1^3\right)^{1/3} \tag{13}$$

We can then write the equation representing the reflected inertia of an MR/ER clutch at the manipulator joint as a function of the clutch torque.

$$J'_c = \frac{1}{2}\pi\rho_d l_d N \left[\left(\frac{3}{4}\frac{T_c}{\pi\tau_y N} + R_1^3\right)^{4/3} - R_1^4\right]\left(\frac{T'_c}{T_c}\right)^2 \tag{14}$$

Figure 6:
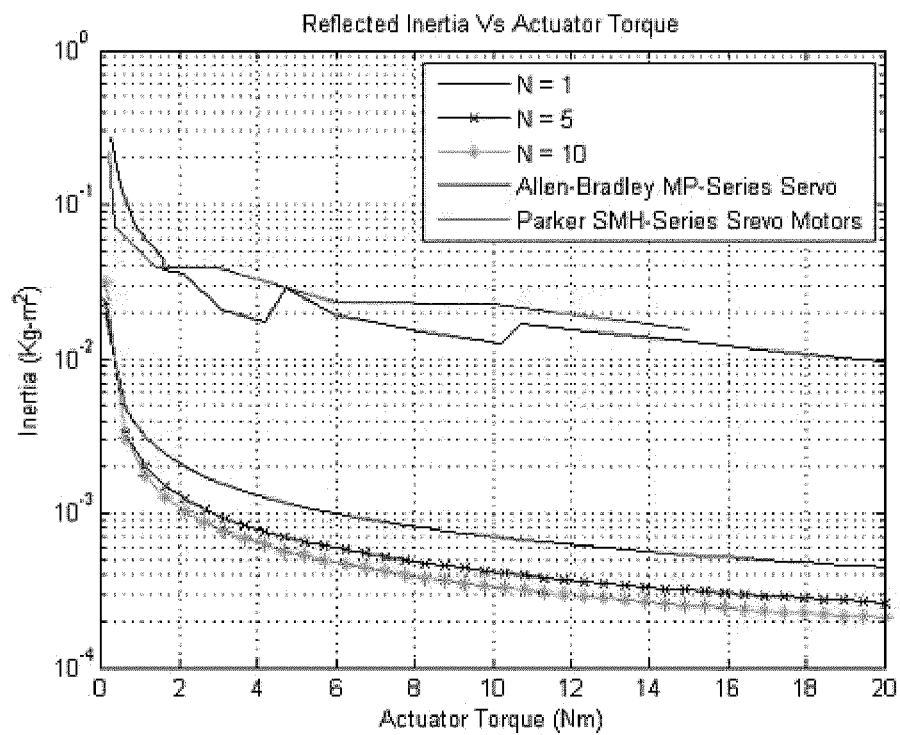
FIG. 6 illustrates the reflected inertia vs. actuator torque of an MRF clutch for $T'_c=5-Nm$, $l_d=1$ mm, $\tau_y=40$ Kpa, $\rho=7.7 \times 10^3$ kg/m$^3$.

FIG. 6 shows the values of reflected actuator inertia for a typical MR clutch having between one and 20 disks. The plot also includes equivalent values for commercially available low-inertia servo motors.

To establish the order in which clutch mass compares to that of servo motors as well as the rate at which clutch mass increases with respect to transmittable torque capacity, a mass-torque relationship has to be developed. This is developed using simplified geometric models but the conclusions are still valid.

Figure 7:
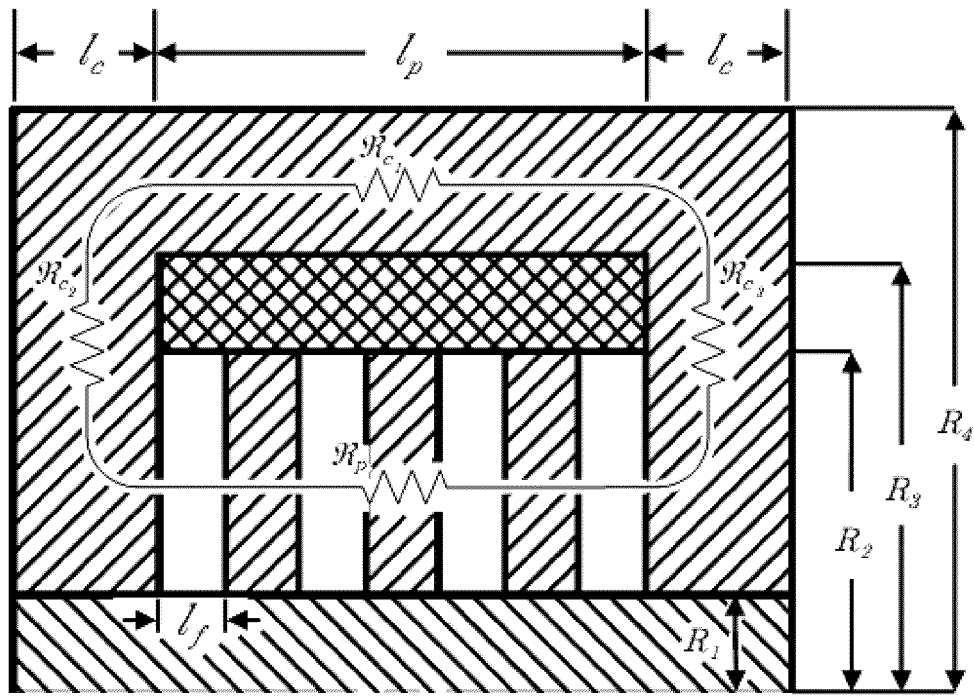
FIG. 7 shows the various radii used in the calculations according to one aspect of the invention.

To develop a relationship between clutch mass and torque capacity for MR fluid clutches, we consider the simplified geometric model detailed in FIG. 7. FIG. 7 is a cross-sectional view of a simplified geometric model of an MR fluid clutch. In the figure, a single amalgamated shaft extends the length of the clutch. Input and output disks are defined as having equivalent geometric and material properties, sharing minor radius $R_1$ and major radius $R_2$. The electromagnetic coil windings are contained between $R_2$ and $R_3$, and $R_4$ defines the outer surface of the ferrous core used to complete the magnetic circuit.

Based on the configuration in FIG. 7, we will solve for required parametric values through the application of magnetic circuit analysis. We divide the reluctance of the core Rc into three sections, namely $R_{c1}$, $R_{c2}$, and $R_{c3}$. The symmetric geometry of the model dictates the reluctance $R_{c2}$ to be equivalent to that of $R_{c3}$. Thus we define the reluctance of the core to be $$\mathfrak{R}_c = \mathfrak{R}_{c1} 2\mathfrak{R}_{c23} \tag{15}$$

where $R_{c23} = R_{c2} = R_{c3}$. We have defined a clutch by the number of output disks N coupled to the output shaft. For N output disks, a clutch is required to have N−1 input disks, and a total of 2N MR fluid interface gaps positioned between the input and output disks. In the simplified model of FIG. 7, we define both geometric, and material properties of the input and output disks to be identical. The disk pack assembly thus contains 2N−1 disks, and 2N MR fluid interface gaps. The reluctance of the disk pack assembly $R_p$ can then be written as $$\mathfrak{R}_p = (2N-1)\mathfrak{R}_d + 2N\mathfrak{R}_f \tag{16}$$

where $R_d$, and $R_f$ are the reluctance of a single disk, and the reluctance of a single MR fluid interface gap, respectively. The reluctance of a material is defined by $$\mathfrak{R} = \frac{l}{\mu_0 \mu_r A} \tag{17}$$

where l is the mean length of the flux path through the material, $\mu_0 = 4\pi \times 10^{-7}$ H/m is the permeability of free space, $\mu_r$ is the relative permeability of the material, and A is the cross sectional area of the material perpendicular to the flux path. Assuming the mean flux path through any of the circuit members lies at its geometric center, we can then derive the reluctance of the individual components of the simplified clutch model to be $$\mathfrak{R}_{c_1} = \frac{l_p + l_c}{\mu_0 \mu_{r_s} \pi (R_4^2 - R_3^2)} \tag{18}$$

$$\mathfrak{R}_{c23} = \int_{\frac{R_2+R_1}{2}}^{\frac{R_4+R_3}{2}} \frac{dr}{\mu_0 \mu_{r_s}(2\pi r)l_c}$$

$$= \frac{\ln\left(\frac{R_4+R_3}{R_2+R_1}\right)}{2\mu_0 \mu_{r_s} \pi l_c} \tag{19}$$

$$\mathfrak{R}_d = \frac{l_d}{\mu_0 \mu_{r_s} \pi (R_2^2 - R_1^2)} \tag{20}$$

$$\mathfrak{R}_f = \frac{l_f}{\mu_0 \mu_{r_f} \pi (R_2^2 - R_1^2)} \tag{21}$$

Here, $\mu_{rs}$ is the permeability of steel, the material used for both the core and disks, $\mu_{rf}$ is the permeability of the MR fluid, $W_d$ is the thickness of a single disk, $l_f$ is the distance between input and output disks forming the MR fluid gap, $l_c$ is the thickness of the equivalent core sections, and $l_p$ is the length of the disk pack, given by $$l_p = (2N-1)l_d + 2Nl_f \tag{22}$$

The flux in the circuit $\phi$ is then given by $$\phi = \frac{I}{\mathfrak{R}_c + \mathfrak{R}_p} \tag{23}$$

where I is the total electric current through the cross section of the magnetic coil defined as, $$I = l_p(R_3 - R_2)J_w \tag{24}$$

Figure 8:
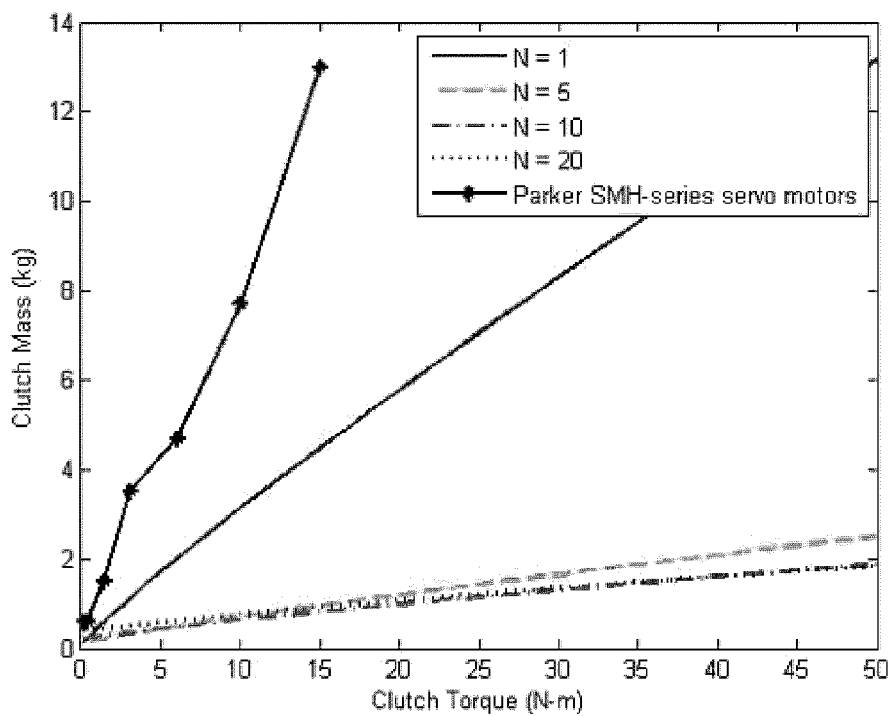
FIG. 8 is a graph showing the mass of simplified MR fluid clutch model vs. torque capacity.

In eqn. (24), $J_w$ is the current density of the coil cross section. The magnetic field intensity H at any point within the circuit is related to the circuit flux $\phi$ by $$H = \frac{\phi}{\mu_0 \mu_r A} \tag{25}$$

where again, $\mu_r$ and A are respectively the relative permeability, and cross sectional area of the material at which the magnetic field intensity H is to be determined. We now define the parameter $\tau^*_y$ as the maximum yield stress at which the MR fluid is to operate. Using data provided by the MR fluid manufacturer (see FIG. 5A) relating the yield stress of the fluid to the applied magnetic field, we define H* as the magnetic field intensity in the MR fluid required to produce the yield stress $\tau^*_y$. Rearranging eqn. (25), and substituting the appropriate MR fluid geometric and material values, we define $\phi^*$ as the flux required in the circuit to produce H* in the MR fluid, $$\phi^* = \mu_0 \mu_{rf} \pi (R_2^2 - R_1^2) H^* \tag{26}$$

where $R_2$ is uniquely defined by the parameters $T_c$, N, $R_1$ and $\tau^*_y$ (refer to eqn. (13)). Thus, for the given set of fixed parameters given in Table I, we solve for the values of $R_3$, $R_4$ and $l_c$ that satisfy eqn. (23) for $\phi=\phi^*$, while simultaneously minimizing the clutch mass $m_{MRC}$, given by $$m_{MRC}=m_c+m_p+m_s+m_w$$

$$m_c=\pi[(R_4^2-R_3^2)l_p+2(R_4^2-R_1^2)l_c]\rho_s$$

$$m_p=\pi(2N-1)(R_2^2-R_1^2)l_d\rho_s+2\pi N(R_2^2-R_1^2)l_f\rho_f$$

$$m_w=\pi(R_3^2-R_2^2)l_p\rho_{cu}$$

$$m_s=\pi R_1^2(l_p+2l_c)\rho_{al}, \qquad (27)$$

where $m_c$ is the mass of the core, $m_p$ is the mass of the disk pack assembly which includes the MR fluid, $m_s$ is the mass of the shaft, and $m_w$ is the mass of the magnetic coil. In eqn. (27), $\rho_s$, $\rho_f$, $\rho_{cu}$, and $\rho_{al}$ are respectively the mass densities of steel, MR fluid, copper, and aluminum. FIG. 8 shows the mass-torque relationship of the simplified MR clutch model and compares it to a commercially available servo motor. It is noted that due to the mass overhead associated with the material required to form the magnetic circuit, the mass-torque ratio of MR fluid clutches is less favorable at very low values N.

TABLE I

PARAMETER VALUES FOR SIMPLIFIED MR CLUTCH MODEL

| | |
|---|---|
| $l_d =$ | $1 \times 10^{-3}$ m |
| $l_f =$ | $5 \times 10^{-4}$ m |
| $R_1 =$ | $1 \times 10^{-2}$ m |
| $T_y^* =$ | 40 kpa |
| $J_w =$ | $2.5 \times 10^6$ A/m² |

Figure 9:
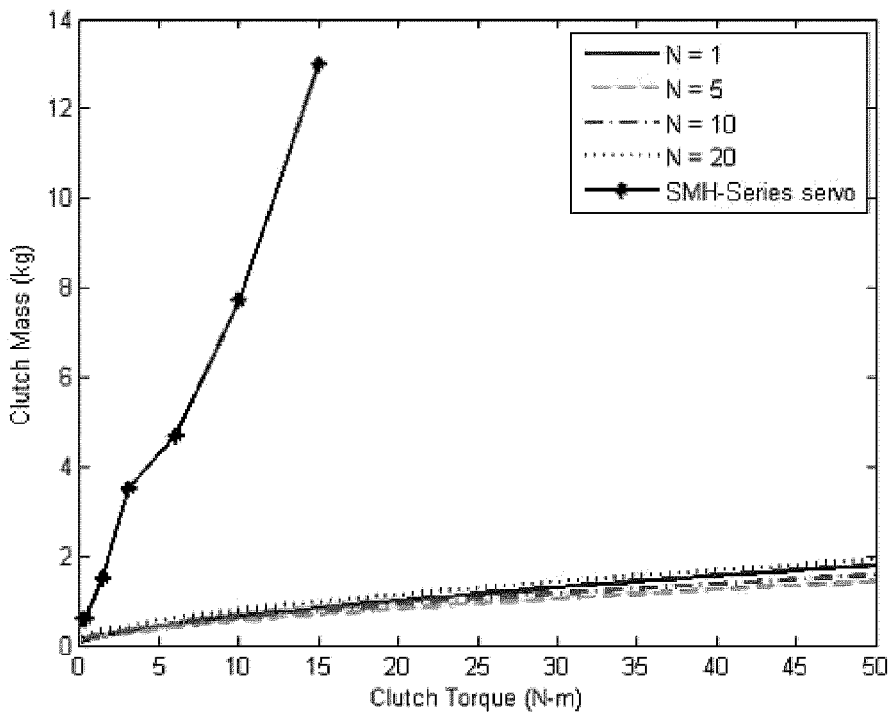
FIG. 9 is a graph showing the mass of simplified ER fluid clutch model vs. torque capacity.

The mass of an ER fluid clutch can be similarly approximated by again considering the simplified geometric model of FIG. 7. By assigning $R_3$ the value of $R_2$, the electromagnetic coil effectively vanishes from the model. We can then express the mass of an ER fluid clutch in terms of the mass equations previously developed, that is $$m_{ERC}=m_p+m_s+m_c \qquad (28)$$

however, we substitute the mass density of aluminum $\rho_{al}$ for all components. As ER fluid clutches do not require ferromagnetic metals, there is more freedom to select lighter materials. Again, $R_2$ is defined by eqn. (13). Thus, given the values of the clutch parameters in Table II, we develop the mass-torque relationship represented in FIG. 9.

In the developed mass-torque relationships of both MR and ER fluid clutches, we observe superior characteristics over the commercially available servo motor. More impressive is the fact that the mass-torque ratio improves dramatically as the torque transmission capacity of the clutch is increased.

TABLE II

PARAMETER VALUES FOR SIMPLIFIED ER CLUTCH MODEL

| | |
|---|---|
| $l_d =$ | $1 \times 10^{-3}$ m |
| $l_f =$ | $5 \times 10^{-4}$ m |
| $l_c =$ | $7.5 \times 10^{-3}$ m |
| $R_4 =$ | $R_2 + l_c$ |
| $R_1 =$ | $1 \times 10^{-2}$ m |
| $T_y =$ | 5 kpa |

One possible issue with both the MR and ER actuators is that they both exhibit hysteric behavior. With MR actuators, since they are constructed using ferromagnetic materials to complete the magnetic circuit, these materials exhibit hysteresis in its magnetic induction B to an increasing and decreasing applied magnetic field H. This means a hysteric relationship between the input current and the output torque transmission of an MR clutch.

ER actuators can also display hysteric behavior as well. However, for ER actuators, it is the ER fluid and not the surrounding material that displays the field dependent hysteric behavior.

Figure 10:
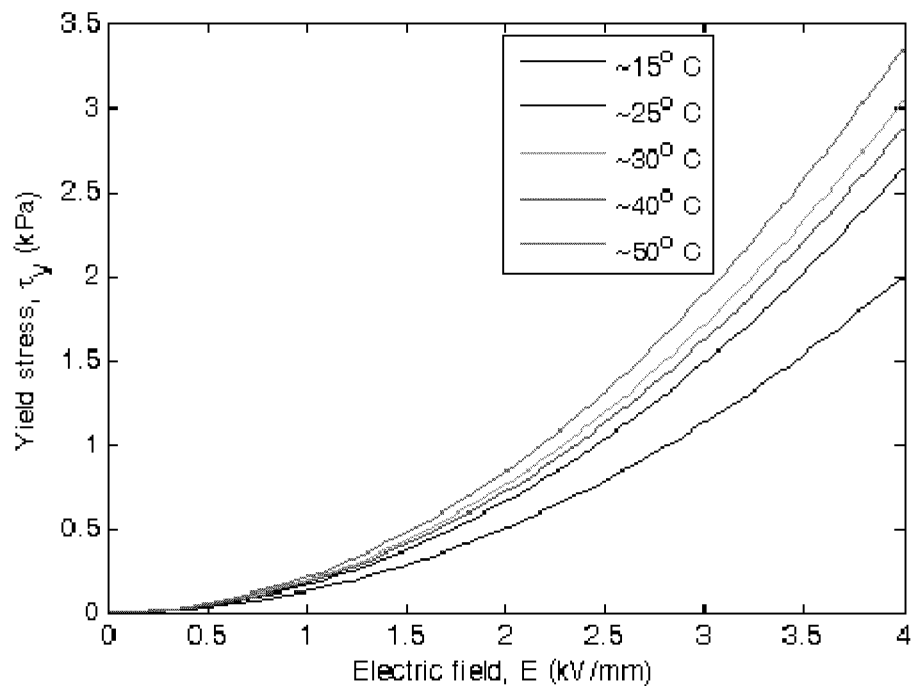
FIG. 10 is a graph showing yield stress vs. electric field of LID 3354S for varying temperature.

The properties of ER fluids are known to change with temperature. Particularly, the yield stress of ER fluids varies with respect to temperature (FIG. 10). The integration of temperature sensors into an ER clutch would thus prove useful in mitigating error.

Figure 11:
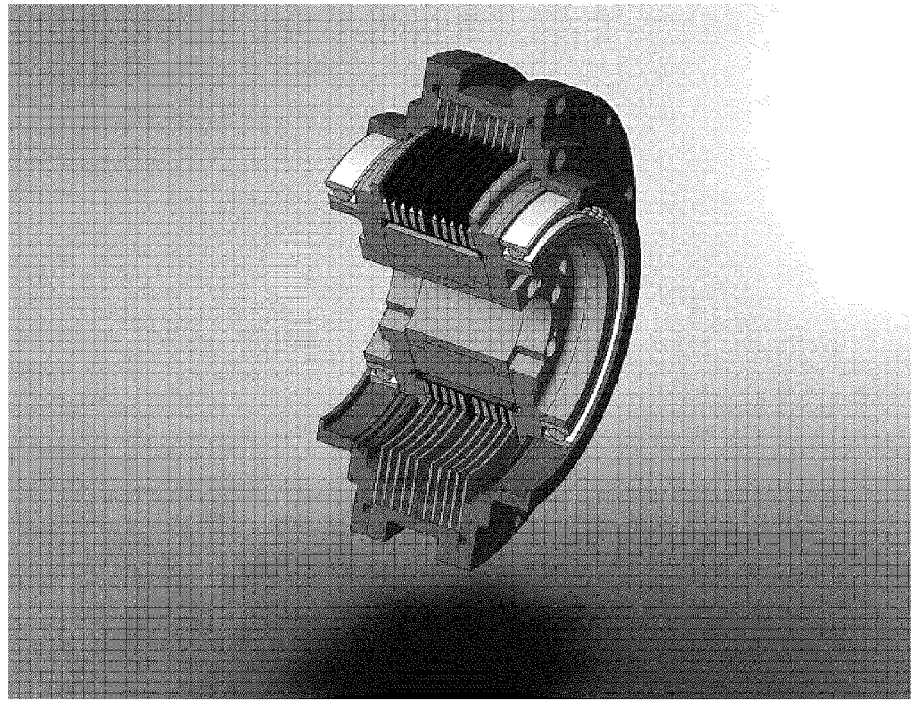
FIG. 11 is a cross-sectional view of an MR clutch according to one aspect of the invention.

Referring to FIG. 11, a cross-sectional view of an MR clutch developed based on the above noted calculations is illustrated. The MR clutch has an input shaft that is belt driven which, in turn, rotates the input torque transmission disks (green disks in the Figure) about the central axis of the clutch. The input torque transmission disks are interleaved with the output torque transmission disks (blue disks in the Figure) and between these disks is a torque transmission fluid. In the case of the MR clutch, the torque transmission fluid is an MR fluid. The magnetic coil required to create the magnetic field passing through the MR fluid is shown as the orange/copper colored component in the Figure. With the magnetic coil energized, the magnetic field passes through the MR fluid and a rotation of the input torque transmission disks about the central axis of the system causes the output torque transmission disks to similarly rotate about the central axis.

Figure 12A:
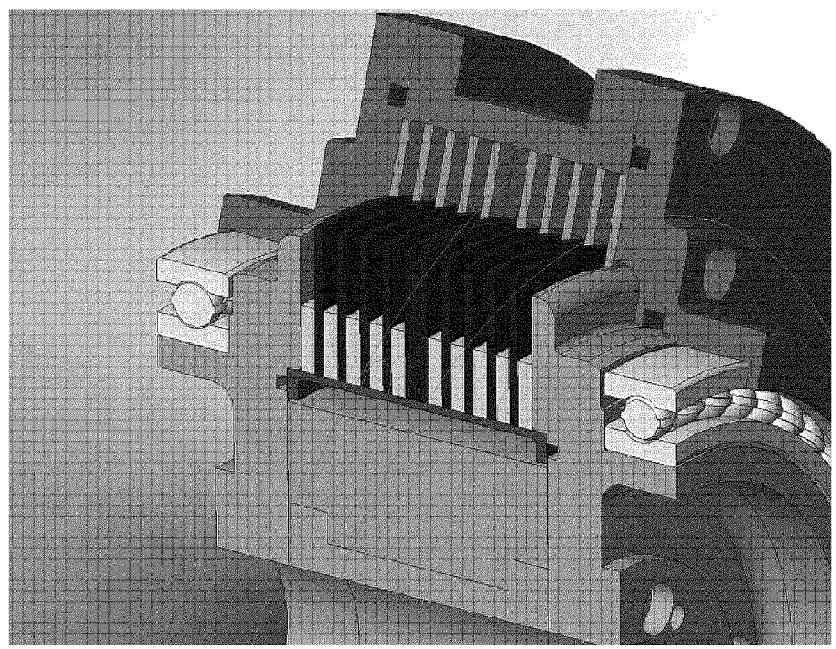
FIGS. 12A and 12B are cross-section views of a section of the MR clutch of FIG. 11 showing the relationship between the input torque transmission disks and the output torque transmission disks.
Figure 12B:
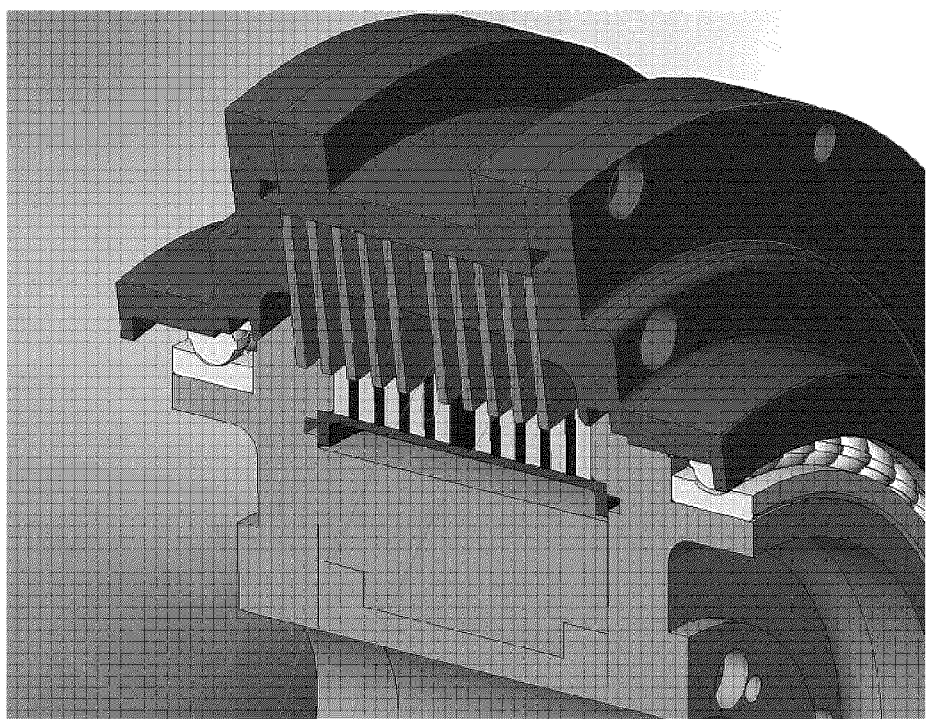
Figure 13:
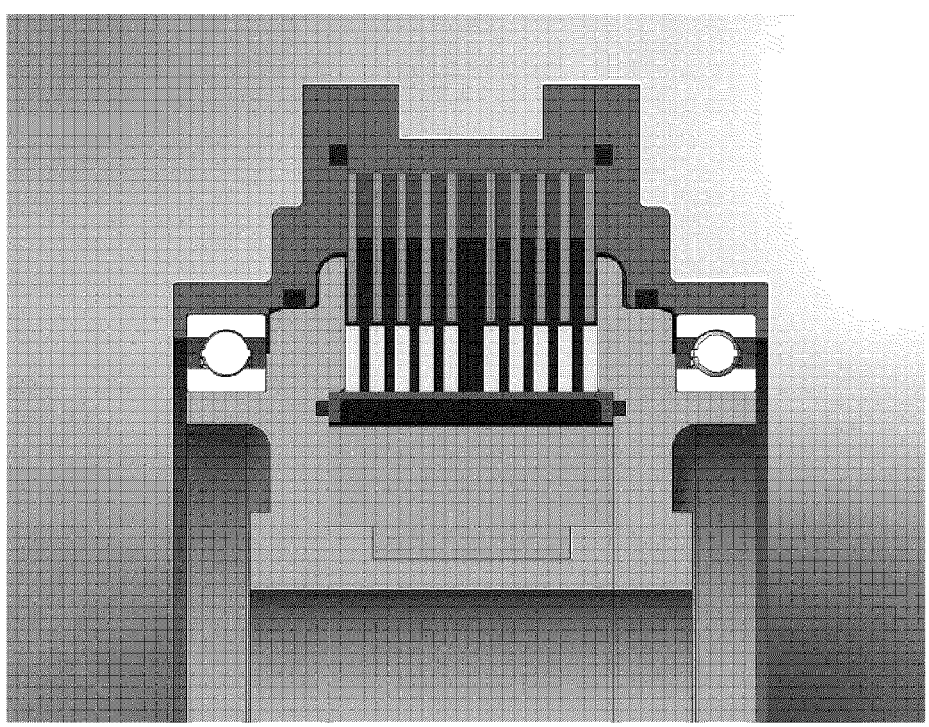
FIG. 13 is a side cross-sectional view of the section of the MR clutch of FIG. 12A showing the spacing between the input and output torque transmission disks.

The mechanical operation of the clutch system can best be explained with relation to FIGS. 12A and 12B. Both Figures are isometric cross-sectional views of a portion of the clutch system. In both Figures, it can be seen that the output torque transmission disks (in blue) are interleaved with the input torque transmission disks (in green). The orange/copper colored electromagnetic coil is clearly visible in both Figures. The outer housing (colored pink) has a top groove to accommodate an input drive belt. FIG. 13 is a side cross-sectional view of a portion of the clutch system. The top portion of the outer housing (in pink) is where the drivebelt is positioned. The torque transmission fluid is in between the input torque transmission disks (in green) and the output torque transmission disks (in blue).

Figure 14:
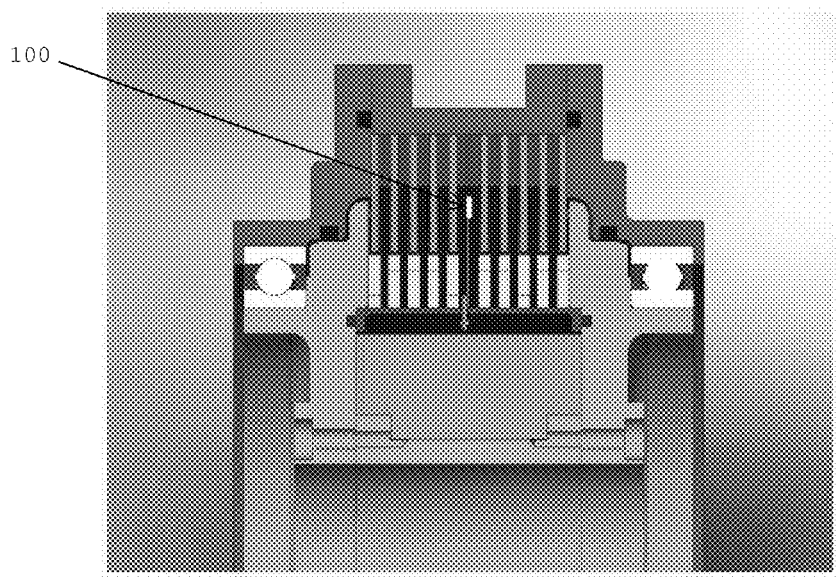
FIG. 14 is a side cross-section view of the MR clutch of FIG. 13 showing the placement of a sensor for determining the intensity or strength of an electromagnetic field passing through the torque transmission fluid.

Referring to FIG. 14, a side cross-sectional view of a portion of the clutch system is illustrated. To determine the strength or intensity of the electromagnetic field passing through the torque transmission fluid, sensors 100 are placed in at least one of the output torque transmission disks. In FIG. 14, the sensor 100 is shown as the white rectangle between two blue torque output transmission disks. The PCB (printed circuit board) for this sensor 100 is shown as the green rectangle connected to the sensor by a thin white line. It should be noted that while the sensor 100 is placed with the output torque transmission disks in this embodiment of the invention, the sensor 100 may equally be placed with the input torque transmission disks.

To determine the strength or intensity gradient of the electromagnetic field, multiple sensors 100 may be placed at different locations on either of the input or the output torque transmission disks. This may be done by placing sensors 100 at different radial distances from the central axis. Such a placement would provide a better reading as to the intensity or strength of the electromagnetic field through the torque transmission fluid.

It should be noted that for an MR clutch, the sensor 100 could be Hall effect sensors that measure the intensity of magnetic fields. For an ER clutch, the sensor 100 could measure the intensity of the electric field through the torque transmission fluid.

Figure 15:
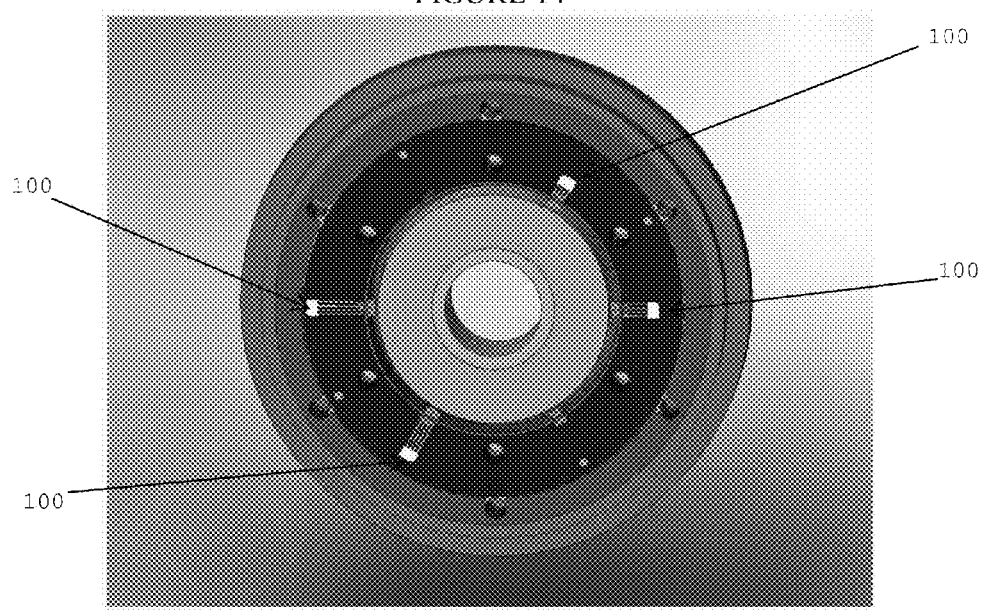
FIG. 15 is a front view of some of the disks of the MR clutch of FIG. 11 illustrating the radial placement of the various sensors in an output torque transmission disk.

To better explain the placement of the sensors 100, FIG. 15 is a front view of a portion of the clutch showing one of the output torque transmission disks and showing the placement of the sensors 100 in suitably dimensioned cavities on this disk. The sensors 100 (the white quasi-rectangular components in the Figure that are attached by wires to green PCBs) are placed so that they are all at different radial distances from the central axis of the clutch. The output of these sensors 100 may be used by a control system to accordingly adjust the strength or intensity of the electromagnetic field. As mentioned above, the higher the intensity or strength of the electromagnetic field, the higher the viscosity of the torque transmission fluid and, accordingly, the greater the amount of torque being transmitted from the input disks to the output disks.

Regarding the sensors for sensing the electromagnetic field intensity, for the MR case, ideally, the magnitude of the magnetic field would be linearly proportional to the input, or drive current. However, due to the ferromagnetic components required for the magnetic circuit, a hysteric relationship is developed between input current and magnitude of the magnetic field in the MRC (MR clutch). For this reason, an MRC explicitly designed for those applications would be better served by bipolar Hall sensors to provide the feedback signal to the controller. Bipolar capability is preferred in the Hall sensors for proper control due to the potential for overshoot when attempting to drive the magnetic field to zero as well as correcting for the hysteric characteristic behavior.

It follows that the location of the sensors 100 should reflect the parameter, or value they are intended to measure, namely the magnitude of the magnetic field in the fluid for the MR clutch. Theoretically, the magnetic flux can be measured anywhere in the magnetic circuit, however, unaccounted dynamics, as well as other circuit anomalies could force us to revisit the problems of sensor collocation. In one implementation, four Hall sensors are thus positioned radially at the axial center of the clutch pack such that the orientation of the Hall element is normal to the magnetic flux.

While the fluid itself reacts on the order of milliseconds, the dynamics of the magnetic field in the fluid can be appreciably slower. This reflects the natural inductance developed by the ferromagnetic material of the clutch. As a result, a radial gradient can form in the magnetic field as it propagates outwards radially. Due to the fast dynamics of the fluid, the result is a variable radial distribution of the shear stress developed in the MRF and applied to the disks' surface during dynamic input current activity. To more accurately calculate output torque during such dynamic activity, Hall sensors are positioned at incremental radii covering the shear region within the clutch pack.

It should be noted that the clutch system illustrated in the Figures is an MR clutch system. However, with some adjustments in the materials, the clutch system can similarly be constructed as an ER clutch.

Regarding the manufacture of the MR clutch system illustrated in the Figures, the different materials are color-coded in FIGS. 11-14 as follows:

- Pink—Nonmagnetic material (aluminum in one embodiment of the invention) which has a mechanical connection to the outer disks, as well as being driven by the drive belt. This is sometimes referred to as the input shaft or input hub.
- Green—Outer disks made of ferromagnetic material (in one embodiment, steel was used). Note that these are the input disks as they are mechanically coupled to the drive belt which forms the mechanical input.
- Red—Outer spacers. These are used to ensure disks do not come into contact with each other. They must be made of nonmagnetic material. In one embodiment, aluminum was used.
- Blue—Inner disks (ferromagnetic, steel). Note that these are the output disks as they are mechanically coupled to the output shaft located at the radial center of the clutch.
- Yellow—Inner spacers (nonmagnetic, aluminum).
- Black—Inner sealing cylinder. This member must be nonmagnetic and functions to seal the MR fluid inside the clutch pack. It is perforated by several slits which allow sensor access to the clutch pack. In one implementation, this was constructed from plastic.
- Yellow—Inner spacers (nonmagnetic, aluminum).
- Orange/Copper—This is the electromagnetic coil. It is wound using 17 gauge square cross-section copper wire. However, other suitable materials and configurations may be used. A square cross-section copper wire was selected as it increased the density of the wire in the coil compared to regular circular cross-section copper wire. However, other configurations of wire (whether having a circular or non-circular cross-section) may be used.

Figure 16:
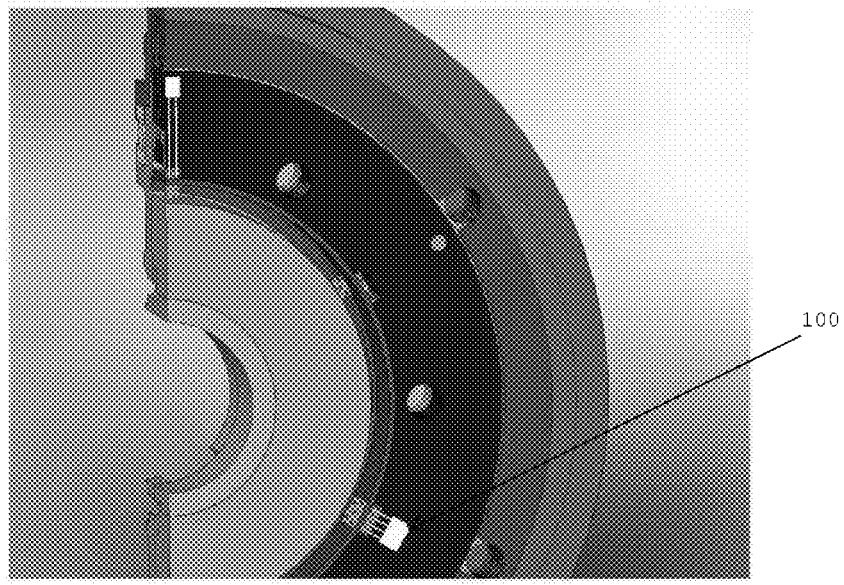
FIG. 16 is a side cross-sectional view of the components in FIG. 15 illustrating the placement of the temperature sensor, the electromagnetic sensor, and the voids where dowels may be placed to mechanically couple the disks together.

Given the susceptibility of torque transmission fluid to change in characteristics due to temperature changes, temperature sensors in the clutch system are recommended. Referring to FIG. 16, the electromagnetic sensors can be seen on the torque output transmission disk. Between the two sensors shown in the Figure is a temperature sensor. In FIG. 15, the temperature sensor can be seen between two electromagnetic sensors in the lower right portion of the output torque transmission disk. The temperature sensor can be used to ensure that the system operates within the operational limits of the components. Multiple temperature sensors can be placed at various positions in the system.

To facilitate manufacturability without dramatically affecting the optimization of the clutch parameters, electromagnetic sensors (Hall sensors for the MR clutch) sensors are housed within a central disk sandwiched between two inner shear disks. All disks have equivalent thicknesses so that they may be cut, or stamped from a single sheet. Following a similar pattern, three temperature sensors are preferably located within the inner spacers. This provides good thermal coupling to the fluid. It is important to monitor the temperature of the fluid to ensure it does not exceed the prescribed operational limits.

Referring again to FIGS. 16 and 15, the various disks used in the clutch system are held together by dowels or other suitable fastening means. The holes or voids (easily visible on the face of the various disks in FIGS. 15 and 16) are used to mechanically couple the disks together. In one implementation, dowels impale the various disks through the holes and then terminate into bores machined into the side plates. Dowels, however, are not the only option. Splines and spot welds (with attendant changes to the configuration of the various disks) may also be used.

For the driving motor (the input to the system), the system illustrated uses a drive belt that travels by the channel visible at the top of the cross-sectional diagram in FIG. 14. Other drive transmission means may also be used. These include flat belts, V-belts, timing belts, roller chains, and shaft drives. Of course, use of any of these would necessitate design changes to accommodate the particular method being used.

The system described above may be used to implement a clutch system with control being based on an estimation of the field sensed by the sensors. For the MR clutch, the Hall sensors may be used to sense the magnetic field and, based on an estimated value for the transmission torque (based on the sensed magnetic field intensity), the magnetic field intensity can be adjusted accordingly.

Figure 17:
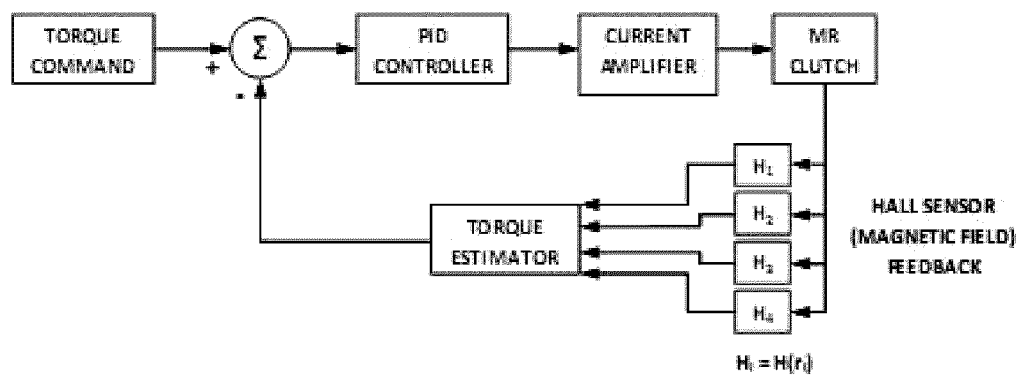
FIG. 17 is a block diagram illustrating torque control using the Hall sensors in the implementation of the invention illustrated in FIG. 11.

In the specific MR clutch described above, the magnetic field is read at four radial locations (we can refer to these as $r_1$ through $r_4$) via the Hall sensors. It should be noted that any number of Hall sensors can be used. However, to detect time varying radial gradients, at least two sensors would be desirable. Given the value returned by the Hall sensors a reasonable estimate for the transmission torque can be calculated. The desired output torque is entered into the system through the torque command. The estimated output torque is subtracted from the torque command to develop the error signal. The error signal is the input to a controller (perhaps a proportional-integral-derivative (PID) controller). The output of the controller subsequently commands the MR clutch drive current (the current in the coil producing the magnetic field). If a PID controller is used in this configuration, the PID controller will drive its output to a state such that it minimizes the magnitude of the error signal. In effect, this action causes the system to deliver an estimate for torque which approaches the torque command. FIG. 17 illustrates a control system which uses this scheme.

Figure 18:
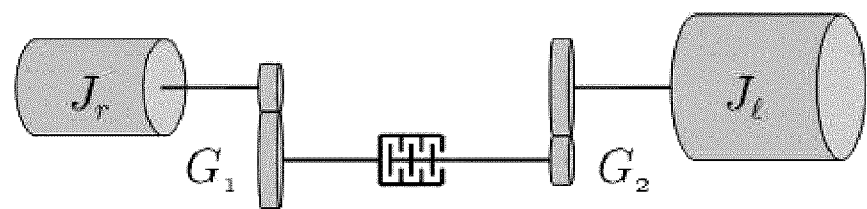
FIG. 18 is a schematic diagram of a distributed active semi-active actuation system according to another aspect of the invention.

The MR clutch described above may be used in any number of ways. The clutch may be used in conjunction with suitable supporting components in a distributed active semi-active actuation configuration. The Distributed Active Semi-Active (DASA) actuation configuration locates a driving motor (the active actuator) at the base of the robot, and a semi-active device (either an MR or ER fluid clutch) at the joint (refer to FIG. 18). The gear ratios G1 and G2 are balanced to give the desired mass, and reflected output inertia at the link. Reducing G1 reduces the requirements of the clutch transmission torque which thus reduces the mass of the clutch, however the reflected output inertia is inevitably increased as G2 must then be increased to compensate. The simplified models explained above have shown how actuating a joint via an MR or ER fluid clutch can be accomplished at greatly reduced mass and reflected output inertia versus conventional servo motors. The impact on safety is immediately appreciated as the effective inertia of the link is instantly reduced. This not only improves manipulator performance, but further allows a manipulator to operate at higher velocities while maintaining safe HIC values in the event of an uncontrolled collision. Moreover, the clutch itself is back driveable, and can be thought of as exhibiting the properties of an ideal torque source. The characteristic of back drivability has been identified as more than desirable in operations requiring physical interaction between man and machine as it facilitates impedance control. While motors themselves are also intrinsically back drivable, the high ratio gear reductions they require are often not. Thus, highly performing low weight robots which implement low mass motors at the expense of high ratio gear reductions rely on torque sensors in the control loop to electronically implement back-drivable behavior. MR and ER clutches possesses a superior mass-torque ratio over their servo motor counterparts and thus can be designed to require much lower ratio gear reductions, if not developed as single unit direct-drive component, either way retaining their intrinsic back-drivability. MR and ER clutches have the added benefit of uniform torque transmission independent of armature position, unlike servo motors which suffer from nonlinearities such as cogging torque.

Relocating the driving motor to the base of a robot to reduce the mass at the link in has previously had some drawbacks. It has been a restrictive practice as the newly required transmission responsible for bringing mechanical power from the base to the joint has commonly introduced unwanted friction and compliance which have reduced performance, and complicated the control system. The DASA implementation however can be controlled to operate in a region in which torque transmission is relatively immune to perturbation in the relative angular velocity $\omega$ within the clutch, effectively allowing the clutch to act as a mechanical power filter. This characteristic which will be explained momentarily allows the DASA system to function with less than ideal mechanical transmission while maintaining the performance and characteristics of a 'stiff' transmission at the joint. To explain this, we consider that the Bingham model is accurate for describing the rheology of the fluid for shear stress $\tau$ above the field dependant yield stress $\tau_y$, as expressed in (3). It is this 'Bingham region' in which we wish the clutch to operate in order to benefit from the aforementioned characteristics. Below the yield stress $\tau_y$, however, the fluid exhibits Newtonian characteristics, that is to say that $\tau$ grows with a non-negligible proportionality to the shear rate $\gamma$. We can thus attribute a field dependant shear rate threshold $\gamma^*$ below which the fluid exhibits Newtonian characteristics, and above which the Bingham model applies. To maintain the clutch in the Bingham region, the fluid at any radius r within the clutch must maintain a shear rate $\gamma$ above $\gamma^*$. To guarantee this condition, we define the field dependant angular velocity $\omega^*$, the threshold above which operation in the Bingham region is ensured as $$\omega^* = \frac{\dot{\gamma}^* l_f}{R_1}. \tag{29}$$

We come to (29) by rearranging (5) and substituting r with its minimum value $R_1$. $R_1$ must be used as it is the critical radius at which the lowest shear rate $\gamma$ occurs within the clutch. The control strategy should therefore attempt to avoid entering the Newtonian region by controlling the motor angular velocity $\omega_m$ to satisfy the condition $$|\omega_m|=|\omega_j-\omega^*|+\epsilon^* \tag{30}$$

where $\omega_j$ is the angular velocity of the joint, and $\epsilon^*$ is a field dependent error margin selected to ensure that the dynamics of the motor have enough time to react to quickly varying values of $\omega_j$. $\epsilon^*$ must be large enough to ensure $\omega \geq \omega^*$ under all dynamic situations, however exact calculation of $\epsilon^*$ may be difficult as there is a reliance on empirical data associated with the dynamics of the joint/link. Care must be taken, however, to avoid unnecessary power dissipation, which for a clutch is defined as $P_d=T\omega$. Because $\omega$ tracks $\omega^*+\epsilon^*$, the value selected for $\epsilon^*$ cannot be arbitrarily large. Crossing into the Newtonian region is required to alter the direction of the torque transmitted to the link when utilizing a single clutch to implement the DASA system. As the motor must change the direction of its output rotation, the clutch torque transmission momentarily enters a dead-zone (courtesy of the Newtonian characteristics), the extent of time in which spent is dependent on the dynamic capabilities of the motor. This has the potential, and in fact the probability of creating substantial backlash, which could severely handicap the system's ability to effectively accomplish precision position control.

Figure 19:
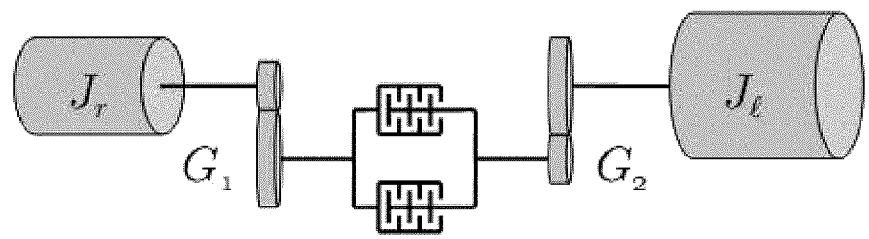
FIG. 19 is a schematic diagram of a pair of clutches in an antagonistic distributed active semi-active configuration.
Figure 20:
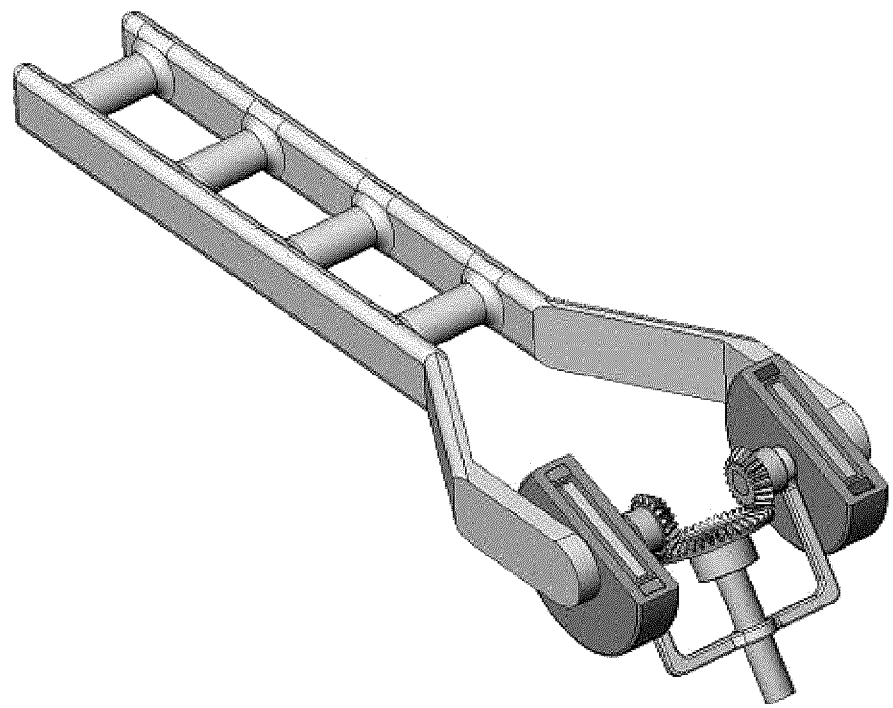
FIG. 20 is a cut-away view of an antagonistic distributed active semi-active actuation system for use as a bidirectional actuation system using a single driving motor.

Another configuration of the DASA system is the antagonistic configuration. An antagonistic configuration of the DASA system is intended to increase performance, and rectify the shortcomings of the single clutch DASA system discussed above. FIG. 19 is a schematic representation of the DASA antagonistic clutch configuration. FIG. 20 shows how an antagonistic clutch assembly (an MR-type clutch assembly in this case) could be coupled to a link.

In the configuration in FIG. 20, the transmission shaft drives the input to both clutches through the transmission means (in this case, gears), however in opposite directions with respect to one another. The antagonistic output of the two clutches is coupled to the link. By energizing one of the two clutches, torque can be transmitted in either the clockwise, or counterclockwise direction. Thus, the antagonistic configuration allows for torque transmission to the joint to alter direction without altering the direction of the motor output, thereby eliminating the backlash introduced by the single clutch DASA. Such devices have been developed for ER fluids. Maintaining rotation of the motor shaft, the bandwidth of the antagonistic-DASA output is limited by the charging and the discharging of the relevant field required to activate the clutch pair. It is anticipated that an antagonistic DASA implementation utilizing ER clutches will have a higher controllable bandwidth over an MR DASA equivalent. This is due to the short charge time associated with electric fields as compared to the propagation of the magnetic field through the magnetic circuit of an MR clutch.

If we label the two clutches of an Antagonistic DASA assembly as C1, and C2, then the motor's angular velocity should track $$\omega_m = \max\{|\omega_j - \omega^*_1|, |\omega^*_2 - \omega_j|\} + \epsilon^* \quad (31)$$

to avoid entering the Newtonian region of operation in either clutch. $\omega^*_1$ is the angular velocity of the Bingham region threshold for clutch C1, while $\omega^*_2$ is the angular velocity of the Bingham region threshold for clutch $C_2$. Note that in our convention, clutch $C_2$ has its input reversed in direction with respect to clutch $C_1$, that is $$\omega_1 = \omega_j - \omega_m \quad (32)$$

$$\omega_2 = \omega_j - \omega_m. \quad (33)$$

The torque production for an Antagonistic-DASA system operating in the Bingham region is then given by $$T_{A-DASA} = \left[T_1(\Phi_1) + T_2(\Phi_2) - \frac{2\pi\eta|\omega_j|}{l_f}(R_2^4 - R_1^4)\right] \quad (34)$$

where $T_1$ and $T_2$ are the field dependant torques produced by clutches C1, and C2 respectively, given by $$T_1 = \frac{4\pi}{3}\tau_y(\Phi_1)(R_2^3 - R_1^3)\text{sgn}(\omega_1) \quad (35)$$

$$T_2 = \frac{4\pi}{3}\tau_y(\Phi_2)(R_2^3 - R_1^3)\text{sgn}(\omega_2) \quad (36)$$

in which $\Phi 1$, and $\Phi 2$ are the fields produced in clutches C1, and C2, respectively. Note that the individual viscous torque contributions of C1 and C2 negate each other at the joint when $\omega_j = 0$. As viscosity of this class of fluids does not always obey ideal models, the antagonistic configuration can effectively mitigate some nonlinearities which would otherwise have to be compensated for by the controller.

Figure 21:
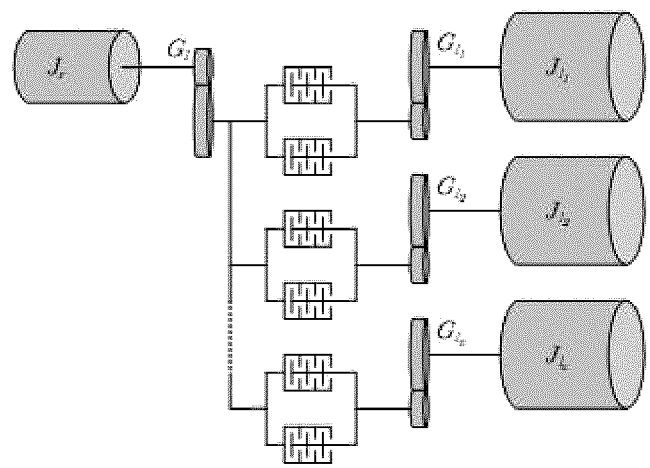
FIG. 21 is a schematic diagram of a system that uses multiple instances of the bidirectional actuation system of FIG. 20 using a single driving motor to drive the various instances of the actuation system.

The Antagonistic-DASA configuration translates a unidirectional active drive into a bidirectional actuation unit. We can consider the unidirectional drive as an independently controlled source of mechanical power. The antagonistic clutch assembly then loads the mechanical drive with the torque requirement dictated by the controller. Increasing the output power specification of the active drive allows for the introduction of multiple antagonistic clutch assemblies to independently load the active drive simultaneously. Pluralization of the antagonistic clutch assembly allows for the actuation system of multiple joints (or conceivably an entire manipulator) to be actively driven by a single motor located at the base. FIG. 21 is a schematic representation of the PA-DASA system. The motivation to pluralize the DASA system stems from the excessive cost resulting from associating both motor drive, and antagonistic clutch assembly with each joint utilizing the system. Moreover, if we attribute any credit to the anticipation that clutches of this type can be produced in mass at a considerable cost saving over servo motors, we may then expect overall production costs of PA-DASA manipulators to be much lower than equivalent manipulators actuated entirely by servo motors.

Figure 22:
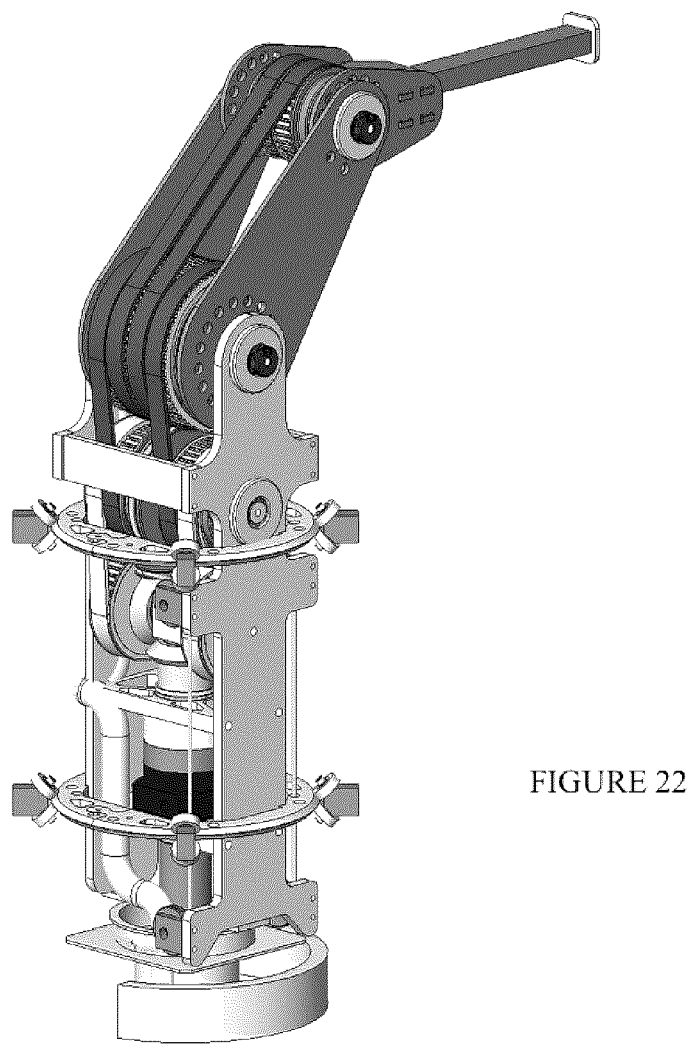
FIG. 22 is an illustration of robotic arm with the drive motor located at a bottom portion of the robot.
Figure 23:
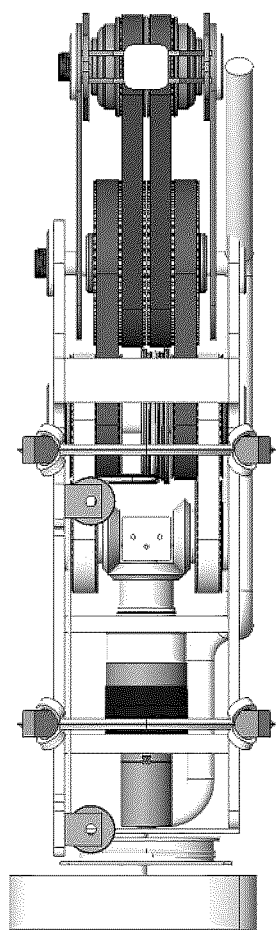
FIG. 23 is a front view of the robotic arm of FIG. 22.
Figure 24:
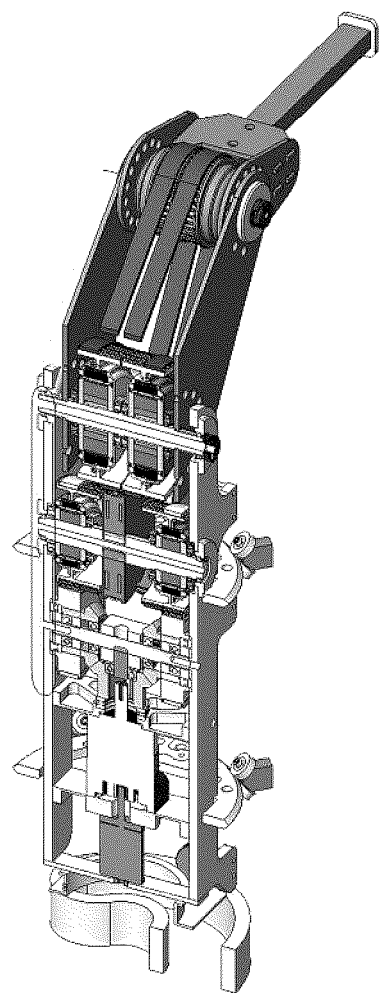
FIG. 24 is a cross-sectional cut-away view of the robotic arm of FIG. 22 illustrating the four clutch mechanisms used.

Referring to FIGS. 22, 23, and 24, illustrations of the robot noted above are presented. As can be seen, the robot has a single drive motor located at the base portion of the robot (seen more clearly in FIG. 23). FIG. 24 illustrates that there are three sets of clutches in the robot, two of which are in color—a first set closest to the drive motor, a second set above the first set, and a third, smaller set at the top of the robot to which only two drive belts are coupled. The third set of clutches is not shown in cut-away in FIG. 24. The drive motor shaft turns in one direction and, as in the configuration in FIG. 20, this turns two gears and thereby two drive belts in opposite directions (see FIG. 23 and the two white colored drive belts). Each drive belt then turns an input shaft to a clutch assembly in the first set of clutches. That clutch assembly in the first set then transfers torque and drives a clutch output drive belt to another clutch assembly in the second set of clutches. The second set of clutches then transfers torque further to the third set of clutches which directly moves the robot arm up or down. From FIG. 23, the two outer drive belts (dark colored) are the input drive belts to the input shafts of the two clutch assemblies in the second set of clutches. The two inner drive belts in FIG. 23 are the output clutch drive belts of the second set of clutches and are coupled to the output shafts of the clutch assemblies in the second set of clutches. These inner drive belts are then coupled to the input shafts of the third set of clutches at the top of the robot.

It should be noted that the robot is capable of being rotated about its vertical axis as if on a platform. Referring to FIG. 22, a yellow cable (also visible in FIG. 23) is coupled to the first set of clutches. The yellow cable (preferably aircraft cable wire) is wrapped about the base or platform of the robot as can be seen in FIG. 23. By activating one or the other of the first set of clutches, the cable rotates the robot in either the clockwise or counterclockwise direction.

The second set of clutches receives torque from the first set of clutches and also transfers torque to the third set of clutches. As well, the second set of clutches moves the arm (coupled to the third set of clutches) up and down. This arm is dark colored in FIG. 22 and is between the first set of clutches and the third set of clutches. Again, by selecting one or the other of the clutches in the second set of clutches (illustrated in cut-away in FIG. 24 above the first set), the arm can be moved up or down.

Referring again to FIG. 22, the third set of clutches at the topmost joint of the robot moves the end of the robot up or down. This third set receives torque from the second set of clutches and can be seen in FIG. 22 as having only two drive belts coupled to it. As with the other sets of clutches, this third set of clutches moves the end of the robot up or down depending on which clutch is active.

Referring to FIG. 24, the cut-away view illustrates four clutch assemblies (in color) of the robot. These four comprise the clutches in the first and second sets of clutches. As can be seen, the two top clutch assemblies in cut-away have output drive belts coupled to the clutch assemblies at the top joint of the robotic arm. The robot in these Figures has the advantage of the Antagonistic-DASA configuration as well as the safety margin provided by the clutch assembly explained above. The Antagonistic-DASA configuration allows a single unidirectional drive motor to be used as a dual directional actuation unit. In the robot of FIGS. 22, 23, and 24, by simply judiciously activating and deactivating specific clutch assemblies, the robotic arm and its end can made to independently move up or down and the robot can be made to rotate about its vertical axis without having to change the direction of the drive motor. As well, all of the clutch assemblies provide the requisite safety margin in the event of an unintended collision between the arm and a human.

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A clutch system for transmitting torque from an input shaft to an output shaft, the system comprising:
   a plurality of input torque transmission disks coupled to said input shaft;
   a plurality of output torque transmission disks coupled to said output shaft, portions of said input torque transmission disks being interleaved with portions of said output torque transmission disks;
   a torque transmission fluid disposed between said interleaved input torque transmission disks and output torque transmission disks, said torque transmission fluid having a viscosity which changes based on a strength of an electromagnetic field passing through said transmission fluid;
   field means for providing an electromagnetic field which passes through said torque transmission fluid;
   a plurality of sensors for measuring a strength of said electromagnetic field at different radial positions along said input torque transmission disks or along said output torque transmission disks, wherein said plurality of sensors measures said electromagnetic field in said torque transmission fluid.

2. A system according to claim 1, further comprising a control system for controlling an output of said field means based on an output of said plurality of sensors, said control system controlling a strength of said electromagnetic field to control an amount of torque being transmitted.

3. A system according to claim 1, wherein said electromagnetic field is a magnetic field.

4. A system according to claim 3, wherein said torque transmission fluid is a magneto-rheological fluid.

5. A system according to claim 1, wherein said electromagnetic field is an electrical field.

6. A system according to claim 5, wherein said torque transmission fluid is an electro-rheological fluid.

7. A system according to claim 5, wherein said field means is an electromagnet.

8. A system according to claim 7, wherein said electromagnet comprises coils using wire having a non-circular cross-section.

9. A system according to claim 7, wherein said electromagnet comprises coils using wire having a rectangular cross-section.

10. A system according to claim 7, wherein said electromagnet comprises coils using wire having a circular cross-section.

11. A system according to claim 1, wherein said system is deployed on a robot.

12. A system according to claim 1, wherein said input shaft is mechanically coupled to a drive motor, said drive motor being located at a base of a robot.

13. A system according to claim 1, wherein said system is located at a joint of a robot.

* * * * *